INVENTORS.
Robert B Way and
BY Carl D Hensey

Charles L Lauenbach
Attorney

April 28, 1959   R. B. WAY ET AL   2,883,960
MACHINE FOR PAINTING POTTERY AND THE LIKE
Filed Nov. 7, 1955   7 Sheets-Sheet 2

INVENTORS
ROBERT B. WAY
CARL D. HERSEY
BY
ATTORNEY

April 28, 1959 R. B. WAY ET AL 2,883,960
MACHINE FOR PAINTING POTTERY AND THE LIKE
Filed Nov. 7, 1955 7 Sheets-Sheet 3
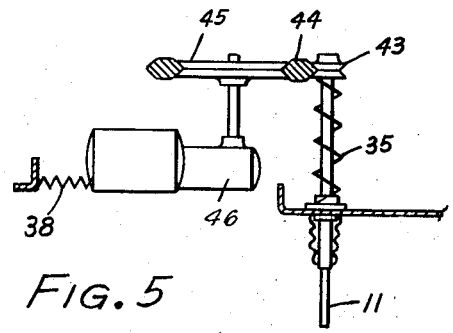
FIG. 5
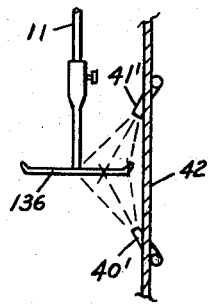
FIG. 4
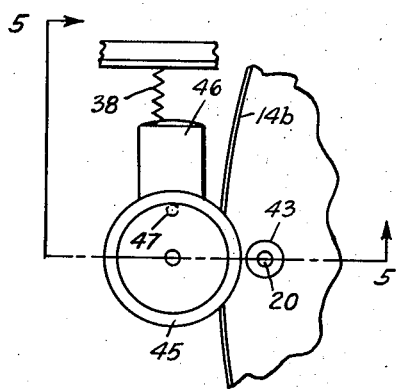
FIG. 6
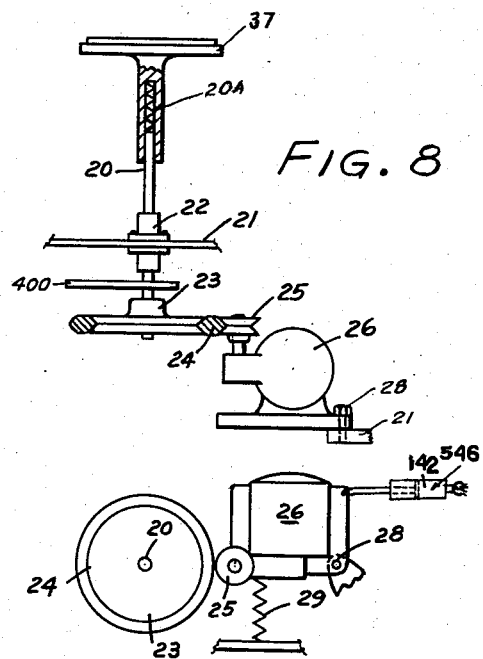
FIG. 8
FIG. 9
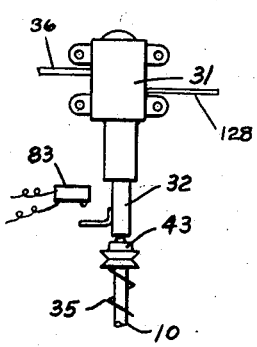
FIG. 7
INVENTORS
Robert B. Way and
Carl D. Henry
BY
Charles L. Lorenbeck
Attorney

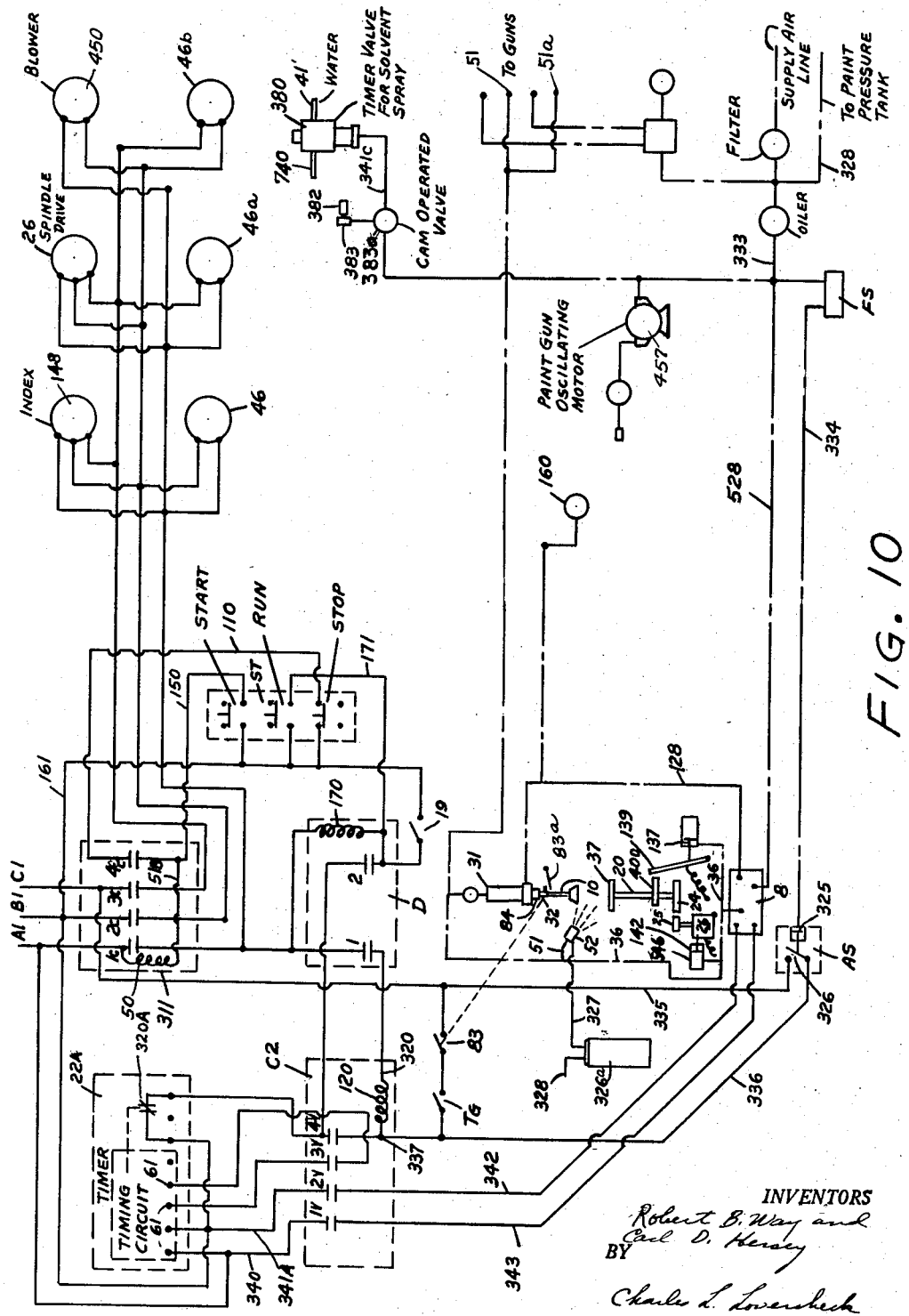

April 28, 1959 R. B. WAY ET AL 2,883,960
MACHINE FOR PAINTING POTTERY AND THE LIKE
Filed Nov. 7, 1955 7 Sheets-Sheet 5

INVENTORS
Robert B. Way and
Carl D. Henry
BY
Charles L. Lovercheck
attorney

April 28, 1959  R. B. WAY ET AL  2,883,960
MACHINE FOR PAINTING POTTERY AND THE LIKE
Filed Nov. 7, 1955  7 Sheets-Sheet 7

INVENTORS
Robert B. Way and
Cal D. Hersey
BY
Charles L. Lovercheck
attorney

United States Patent Office 2,883,960
Patented Apr. 28, 1959

2,883,960

MACHINE FOR PAINTING POTTERY AND THE LIKE

Robert B. Way and Carl D. Hersey, Erie, Pa.

Application November 7, 1955, Serial No. 545,145

15 Claims. (Cl. 118—301)

This invention relates to decorating equipment and more particularly to machines for applying a finished coat of contrasting color to various parts of the surface of various articles of manufacture.

In the pottery industry where plates and various other articles are manufactured, it is frequently desirable to apply coatings of various contrasting colors to various parts of the articles in order to provide the desired appearance. It has heretofore been necessary in many instances to at least partially bake or harden the pottery or plates before the decorations are applied thereto. By applying the combination of principles disclosed herein, it is possible to apply decorations to the pottery before it is hardened by baking or the like by means of the flexible resilient mask, the cushioning spring, and the rubber liner.

More specifically, it is an object of this invention to provide a machine for applying decorating materials to the surface of pottery which is simple in construction, economical to manufacture, and simple and efficient to use.

Another object of the invention is to provide a machine for painting wherein the article to be painted is supported on a rotatable spindle and masks to direct the decorating material to the desired areas are supported on a rotatable table thereabove whereby the masks can be moved to another position to be washed, rotated to another position to be dried, and thereby made ready for subsequent painting operations.

Another object of this invention is to provide a specific kind of machine for sequentially applying a mask to an article to be painted, rotating the mask to a position to be washed, and subsequently rotating the mask to various positions for drying operations and back to painting position.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 4 is a cross sectional view taken on line 4—4 of Fig. 3;

Fig. 5 is a detailed view of the driving mechanism for rotating the masks during the drying operation taken on line 5—5 of Fig. 6;

Fig. 6 is a top view of the mechanism shown in Fig. 5;

Fig. 7 is an enlarged view of the device for pushing the mask support with the mask down into engagement with the article to be decorated;

Fig. 8 is an enlarged view of the driving mechanism for the article support;

Fig. 9 is a top view of the mechanism shown in Fig. 8;

Fig. 10 is a schematic view of the air and electric circuit for operating the machine;

Figure 1:
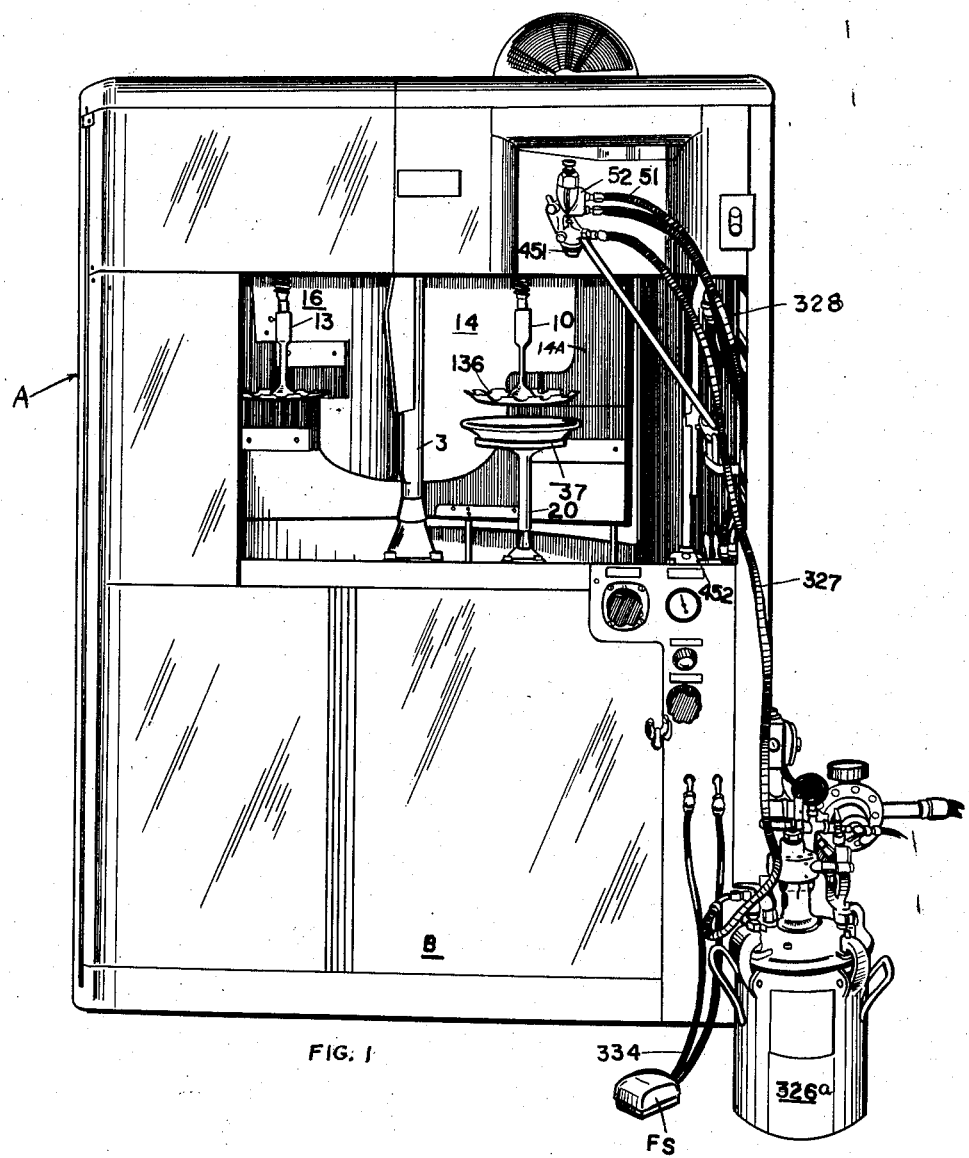
Fig. 1 is a view of the machine according to the invention with the front cover thereof removed.
Figure 3:
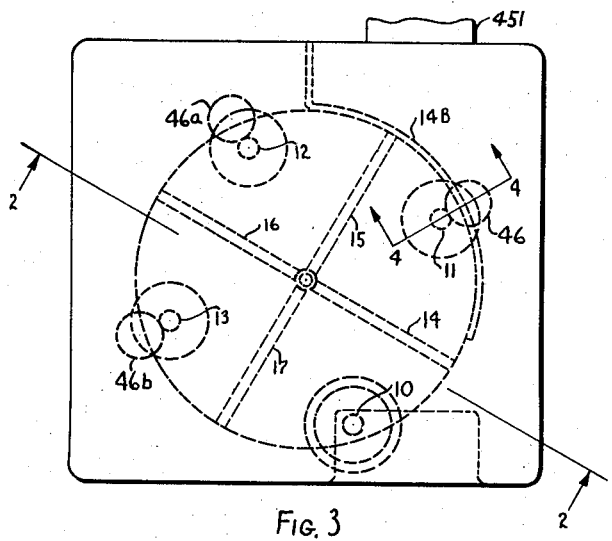
Fig. 3 is a top view of the machine shown in Figs. 1 and 2.
Figure 3A:
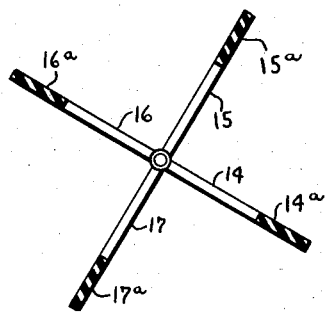
Fig. 3a is a cross sectional view taken on line 3a—3a of Fig. 17.
Figure 2:
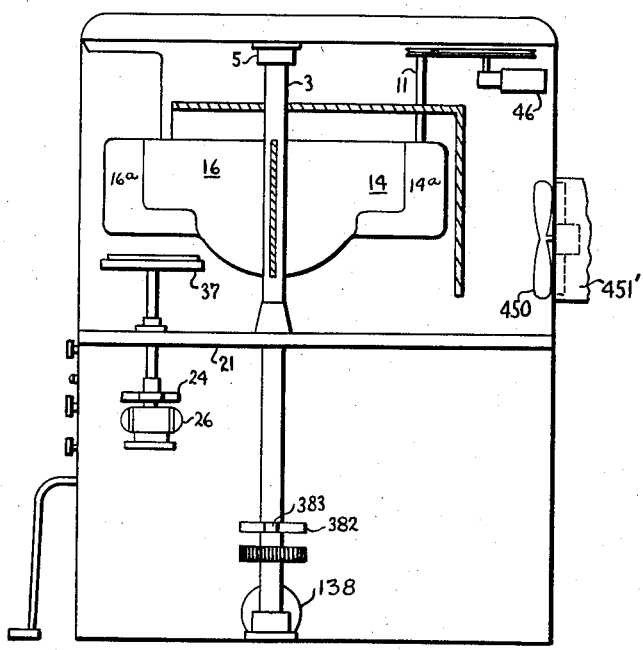
Fig. 2 is a cross sectional side view of the machine shown in Fig. 1.
Figure 11:
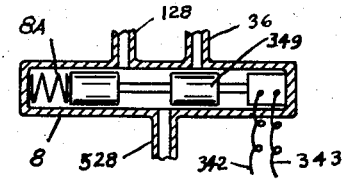
Fig. 11 is a cross sectional view of the valve for operating the air circuit in the machine.
Figure 13:
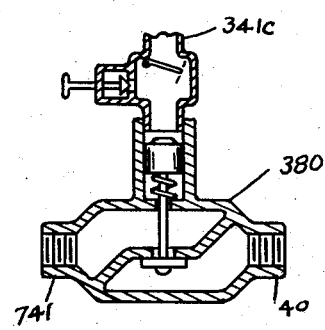
Fig. 13 is a cross sectional view of the timing valve of the device.
Figure 14:
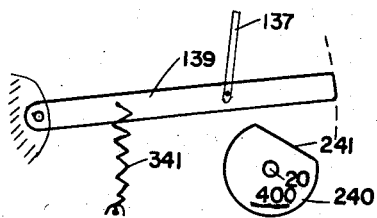
Figs. 12 and 14 are views of the shaft positioner according to the invention.
Figure 12:
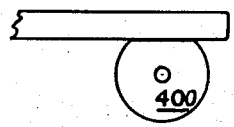
Figure 16:
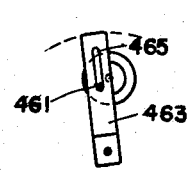
Figs. 15 and 16 are views of the paint gun oscillating mechanism.
Figure 18:
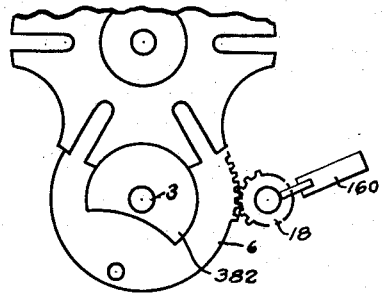
Fig. 18 is a bottom view of the Geneva drive of the machine.
Figure 19:
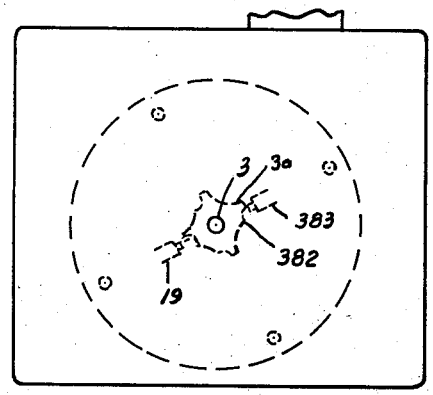
Fig. 19 is a top view of the machine showing the cams for operating the electrical limit switches.

Now with more specific reference to the drawings, a paint machine 1 is shown with a rotatable article supporting spindle 20. The machine 1 has a fabricated iron frame made of structural steel members and the entire machine 1 is enclosed in a case A. The case A has a front inspection door B thereon and has a shaft 3 supported at the bottom of the machine 1 in a bearing 4A and at the top of the machine 1 in a bearing 5 and rotated by an indexing mechanism 6. The indexing mechanism 6 is made up of a Geneva drive, shown schematically in Fig. 18, operated from a one revolution clutch. The one revolution clutch is of a conventional design familiar to those skilled in the art and is indicated at 160 operating spur gear 18. This type of clutch is disclosed in Patent No. 2,471,930. The clutch drives one revolution to advance the table ninety degrees each time the actuating pin is pulled by a cylinder 138. Supported on the shaft 3 is a horizontally disposed disk shaped member 4 which forms a ceiling for the painting, mask washing, and drying compartments and carries at spaced locations thereon rotatable mask carrying members 10, 11, 12, and 13 which are separated from each other by vertically extending downward partitions 14, 15, 16, and 17, respectively. The radially extending partitions 14, 15, 16, and 17 are attached along their upper edges to the disk shaped member 4 and form an enclosure therewith and prevent paint vapor from one enclosure from entering the adjoining enclosure. The radially extending partitions 14, 15, 16, and 17 are welded to the shaft 3 and have flexible edge portions 14A, 15A, 16A, and 17A, respectively, which form an effective seal with the inside of a cylindrical baffle 14B (Fig. 3). The bottom edges of the spider partitions 14, 15, 16, and 17 are also flexible rubber and rubber sheets are attached to a support 21 to register with the sheets on the spiders 14, 15, 16, and 17 and, therefore, form a seal therewith.

*Article support*

The article support 37 is shown in greater detail in Fig. 8 and is made up of the supporting shaft 20 supported on the support or fixed frame member 21 which is in turn fixed to the frame of the machine 1. The shaft 20 is supported on the frame 21 by means of bearings 22 and extends downwardly therefrom and terminates in an end having a pulley 23 which has a V-belt 24 attached to its entire periphery. The V-belt 24 engages a pulley 25 on a motor 26 to drive the shaft 20. The motor 26 is swingably mounted on the frame 21 at pivot 28 and the motor 26 is rotated about the pivot point 28 by means of an air cylinder 546, shown schematically in Fig. 10, to engage the V-belt 24. A return spring 29 urges the motor 26 outwardly when air is cut off, the operation of which will be described in greater detail infra. The top surface which engages the article or pottery plate will be covered with foam rubber or like material to provide a soft surface not injurious to the pottery. The article support 37 is telescopically mounted by means of a cylindrical portion on the shaft 20 and has a compression spring 20A thereon which yieldingly urges the support 37 upward but yields downward when the green article is engaged by a mask 136. The mask 136 will be made of flexible material such as thin sheet metal when used to paint green unbaked pottery. A duct 451' for exhausting paint fumes has a fan and motor 450 which drives the fumes through the duct 451'.

A paint gun 52 may be of the type commonly used in industrial painting and finishing and, in addition to the gun shown, several guns could be used in parallel. The paint gun 52 is movably supported by means of a crank 452 on the machine 1 so that it plays its spray over the area being painted simulating the movement of a manually held paint gun held by an experienced painter. An experienced painter moves the paint gun in from side to side relationship, thereby covering the work with an even film of paint.

Figure 15:
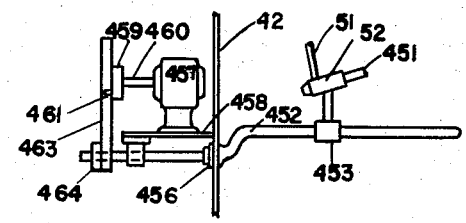
Figure 17:
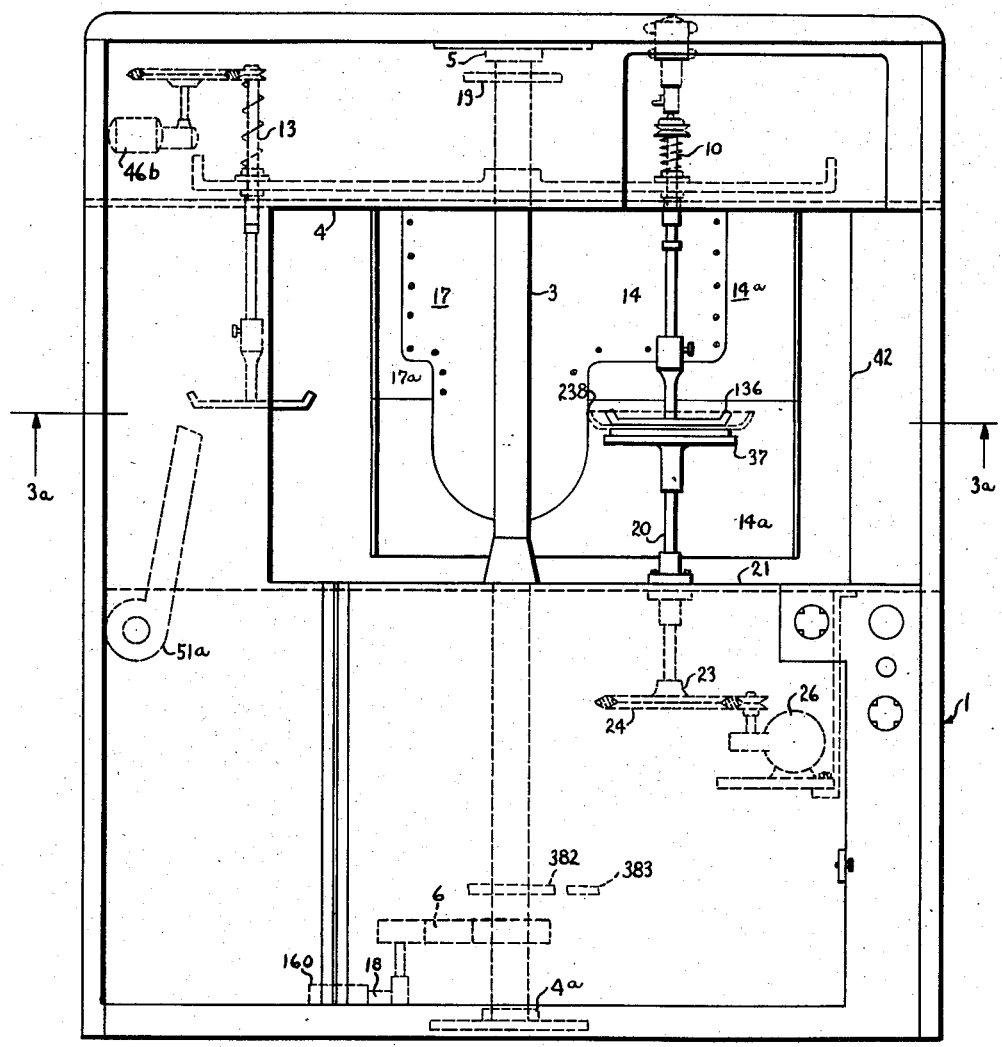
Fig. 17 is a front view showing certain parts of the machine.

Fig. 15 shows the paint gun 52 having a nozzle 451 and clamped to the crank 452 at 453. The crank 452 is mounted in a bearing 456 in a frame member 42. A motor 457 is fixed to the frame member 42 at 458 and has a plate 459 attached to its shaft 460. The plate 459 has an eccentric pin 461 attached thereto offset from the axis thereof so that the pin 461 rotates in a circular path around the center of rotation of the shaft 460. A crank arm 463 is fixed to the crank 452 at 464 and the crank arm 463 has a slot 465 formed therein. The slot 465 receives the pin 461. Therefore, as the motor shaft 460 rotates, the crank arm 463 is oscillated and, therefore, the crank 452 having the gun 52 mounted thereon is oscillated. This causes the gun 52 to swing in an arcuate path around the crank 452 and the nozzle 451 plays a paint spray over the work.

Each of the mask carrying members or shafts 10, 11, 12, and 13 is freely rotatable in the horizontally disposed plate 4 as the plate 4 progressively indexes through its four positions spaced ninety degrees apart around the shaft 3. The positions or stations are:

1. Load and paint;
2. Wash;
3. Spin dry; and
4. Dry.

Each of the shafts 10, 11, 12, and 13 progressively moves through these positions. When a part is put on the support 37 and the operator presses the foot pedal, the cycle is started. A cylinder 31 is actuated by air from a pipe 36 to push the shaft 10 down against the force of a spring 35 to bring the flexible mask 136 into contact with the article being painted. At the same time, the motor 26 is moved by air from the pipe 36 flowing into a space 142 in the cylinder 546 to swing the motor 26 around pivot 28 and, thereby, engage the pulley 25 with the belt 24 after the mask 136 is in contact with the article. Air from the pipe 36 through a pipe 51 also actuates the paint gun 52 and starts the gun 52 spraying paint onto the part 238 supported on the support 37 while the part is being rotated by the motor 26.

Washing cycle

While paint is being sprayed on the part held between the mask 136 supported on the shaft 10 and the support 37, the mask supported on the shaft 11 is being washed by solvent sprayed thereon from nozzles 40' and 41'. The shaft 11 having its mask supported thereon which has been used to paint a part on the preceding cycle has been advanced to the position shown and is, of course, disposed in its position between the partitions 14 and 15 and its pulley 43 has moved into engagement with a belt 44 on a pulley 45 of a motor 46 driving the pulley 45. A spring 38 urges the pulley 45 tightly against the pulley 43. The motor 46 spins the mask supported on its shaft while solvent from the nozzles 40 and 41 sprays thereon. The solvent spray or water in this case is controlled as follows:

As soon as the Geneva gear drive has stopped the member 4 in position, a cam 382 fixed to the shaft 3 having cam surfaces 3a will be in engagement with the follower on a valve 383. When the plate 4 has stopped in operating position, the cam 382 holds the valve 383 open. This will allow air from a line 341 to actuate a timer valve 380 which will allow water to flow therethrough for a predetermined time and allow the nozzles 40 and 41 supported on the sides of the machine 1 to spray solvent on the mask, the water being supplied from pipe 740.

At that time, the shaft 12 mounted between the partitions or baffles 15 and 16 has moved with its pulley into contact with a pulley similar to the pulley 45 on the driving motor 46. It is spun by the motor 46a to throw off or spin off by centrifugal force the excess solvent which it had accumulated on the mask when solvent was sprayed on the mask on the previous cycle or wash cycle when it was in its position being washed where the shaft 11 is now shown.

While the shaft 12 between the baffles 15 and 16 is in the position shown, the shaft 13 is in its position between its baffle 16 and 17. Air from the pipe 51a is blown over the mask supported on shaft 13 which aids the solvent thereon to dry off so that the mask will be ready for use during the next cycle. Upon the next cycle, the shaft 13 is moved to the position shown for the shaft 10.

After paint has been sprayed on the article a predetermined time as set on a timer 22A, the timer 22A will open the circuit to a valve 8 to change the flow of air as will be later described and the cylinder 31 will retract a shaft 32 and allow the spring 35 to move the mask out of contact with the work. This air will actuate the cylinder 138 which will actuate the Geneva drive and index the plate 4 to another position. The operator can then remove the article from the support 37 and replace it with another article to be painted. The indexing mechanism will rotate the shaft 3 with the plate 4 thereon having the shafts 10, 11, 12, and 13 carried therewith to advance the shaft 10 to the position where the shaft 11 is shown, the shaft 11 will be advanced to the position where the shaft 12 is shown, the shaft 12 will be advanced to the position where the shaft 13 is shown, and the shaft 13 will be advanced to a position over the support 37 where a new plate can be painted. This cycle of operation will continue until the operator opens toggle switch TG or discontinues operating foot pedal FS and stops the machine 1.

Air and electrical circuit

The air and electrical circuit for accomplishing the painting operation disclosed above is shown in Fig. 10. A three phase power supply is shown from wires A1, B1, and C1. The wire B1 is connected through contactor ST having its push buttons Start, Run, and Stop thereon with a solenoid 50 connected to the wire A1. The other side of the solenoid 50 is connected through a wire 51B to a wire 150 to one side of the start contactor ST. The wire 51B is also connected through a contact 4C on a switch 311 to a wire 110 and through the wire 110 to the Stop switch and through the Stop switch to a wire 161 to the wire B1. When the push button Start is depressed, the solenoid 50 will be energized. The contacts on the switch 311 numbered 1C, 2C, 3C, and 4C will be closed and the solenoid 50 will be locked in by the contact 4C through the wire 110, the stop switch, and the wire 161.

The motors 26, 46, 148, 450, and 46a (and 46b) will be started and the motors will drive the pulleys attached thereto constantly. The wire 161 is also connected through Run switch through a wire 171 to a solenoid 170. The solenoid 170 is also connected to the wire 161 through No switch 19. The No switch 19 is closed by a cam 3a on the main shaft 3 when the machine 1 is indexed to a spray position. The switch 19 acts as a safety device to insure that the machine 1 is indexed to the proper position before spraying is allowed to start. A switch 83 is connected in series with an actuating switch TG and causes the macihne 1 to recycle when the toggle switch TG is closed. The motor 26 will drive the article support shaft 20 when the pulley 23 is moved into contact with it by the cylinder 546. As soon as the air supply and the solvent and paint supply have been properly connected, the machine 1 can be started.

In order to have the shaft 20 with the article support 37 thereon stop in exactly the same position each time a painting cycle has been completed, a shaft positioner is provided. A cam 400 is secured to the shaft 20 and the cam 400 has a cylindrical surface 240 flattened on one side 241. A lever 139 is swingably connected to the machine frame and to a piston rod 137 of a cylinder 138. When air enters the cylinder 138, the lever 139 is swung out of engagement with the flat surface 241. When the air is shut off from the cylinder 138, a spring 341 swings the lever 139 back into locking engagement with the flat surface 241.

To start the machine 1, the Start button is pressed. This picks up relay switch 311 and locks it in through the contact 4C and the Stop contact and puts power on the motors 46, 46a, 26, and 148 and starts them. If additional washing and/or drying stations are to be provided, the motor 46b could be used to rotate shafts corresponding to the shafts 10, 11, 12, and 13. If the table or frame 21 is in position to bring a shaft 10, 11, 12, or 13 over the shaft 20, the switch 19 will have snapped closed and reopened as the cam 3a moves past it. If the table 21 is not in position, the Run button is pressed which picks up a relay D and connects power to a terminal 320 of a solenoid 120 of a relay C2. The relay 311 locks itself in through the contact 4C and through the Stop button. The relay D locks itself in through a normally closed contact 320A on the timer 22A. The operator then may put an article to be painted on the support 37 and attach masks which are counterparts of the article on the shafts 10, 11, 12, and 13. A paint supply tank 326a will be connected through a hose 327 to the gun 52. An air supply is connected to the pipe shown for air supply and a pipe 328 is connected to the pressure tank. The operator may then depress the foot pedal FS. This allows air to flow from a pipe 333 to a pipe 334 and exerts a force on a piston 325 on an air switch AS. This will close a contact 326 and apply power from a wire 335 to a wire 336 and to a terminal 337 on the solenoid 120. When the relay C2 closes, power from wires A1 and B1 will flow through wires 340 and 341A to wires 342 and 343 and energize the valve 8. When the valve 8 is energized against the force of a tension spring 8A, a piston 349 is pulled to the right and admits air from a line 528 to the line 36 to a cylinder 31 which drives a clamp 32 down on the part supported on the shaft 20 and allows air to flow to the cylinder 546 which forces the motor 26 to pivot about its support, engaging the V-belt 24 on the pulley 23 and disengaging the lever 139 from the cam 400, thereby allowing the shaft 20 to rotate and air flowing through valve 8 and through the pipe 51 to actuate the spray guns. When the timer 22A times out ofter the time preset thereon has elapsed, the NC contact 320A on the timer 22A opens and drops out the relay C2 and the relay D and then recloses after an instant. This opens the circuit to the solenoid valve 8 by opening contacts 1V and 2V on relay C2 and interrupting current through the wires 342 and 343. When the valve 8 closes to the pipe 36, it opens to a pipe 128 and applies air to the air cylinder 138 to index the machine 1 to the next position.

In order for the machine 1 to operate automatically, the toggle switch TG is closed and the microswitch 83 is actuated when it is closed by cam 83a upon clamp 32 engaging it. That is, when the clamp 32 moves up, it will strike the microswitch 83 and close it and the microswitch 83 will, therefore, perform the same function as the foot pedal FS and will be actuated on the upper movement of the spindle and the machine will repeat its operation or recycle. As soon as the cam 83a engages the switch 83 on the upward stroke, the solenoid 120 will be actuated and the cycle will be repeated.

The foregoing specification sets forth the invention in its preferred practical forms but the structure shown is capable of modification within a range of equivalents without departing from the invention which it is to be understood is broadly novel as is commensurate with the appended claims.

The embodiments of the invention in which an exclusive property or privilege is claimed are defined as follows:

1. A finishing machine comprising a first support, an article support rotatably mounted on said first support and restrained against axial movement, means to selectively rotate said article support, a second support for a plurality of masks, said second support having means for holding a plurality of masks thereon, indexing means for said second support to bring each said mask support means selectively into position over said article support, means to move each said mask adapted to be supported in said mask support means into engagement with an article adapted to be supported in said article support, and baffle means on said second support between each said mask support providing partitions between said mask supports.

2. The machine recited in claim 1 wherein means is provided on said first support to spray solvent on said masks at a position remote from said article support, and means is provided remote from said solvent spray means to dry said masks, said indexing means stopping said second support with one said mask at said solvent spray means and one said mask at said drying means upon each indexing movement of said second support.

3. The machine recited in claim 2 wherein said mask support means are disposed around a center of rotation of said second support and means is provided on said machine to rotate each mask support means as it is indexed into washing position and into drying position.

4. A painting machine comprising a frame having a rotatable article support thereon, a first, a second, a third, and a fourth station on said frame, said article support being disposed at said first station, spray painting guns supported on said frame adjacent said article support at said first station, solvent spray means on said frame at said second station, drying means at said third station, a rotatable support disposed above said stations and having depending baffles adapted to divide said frame into four compartments, a rotatable mask support between each two adjacent said baffles in each said compartment, means to rotate said mask supports in said compartments at said second and said third stations, and means to urge each of said mask supports into engagement with an article adapted to be supported on said article support at said first station.

5. The machine recited in claim 4 wherein said means to rotate said mask supports comprises spaced motors on said frame, said mask supports being adapted to move into contact with driving means on said motors whereby said mask supports are rotated while said solvent is sprayed thereon at said second station and said mask supports are rotated rapidly at said third station to dry the masks.

6. The machine recited in claim 4 wherein said means to move the mask into engagement with said article comprises a cylinder on said frame having a piston therein, and means to actuate said piston to bring a member attached thereto into engagement with said mask support at said first station.

7. A finishing machine comprising a frame, an article support supported on the upper end of a shaft, said shaft being rotatably supported in a bearing in said frame, driving means on the lower portion of said shaft, a driving member, means to move said driving member into engagement with said driving means, means to stop said shaft in a predetermined position, a plurality of mask supports disposed on a rotatable member on said frame above said article support and rotatable around an axis, means to selectively stop each mask on said mask supports above said article support, partitions between each said mask each defining a compartment, driving means disposed on said machine adjacent each said compartment, said mask supports each having means thereon selectively engageable with each said driving means as said mask supports are stopped in position after being rotated, said driving member comprising indexing means adapted to stop each said mask support in engagement with said driving means, means to spray solvent on said masks in one said position, and means to dry said masks in two other said positions while said masks are disposed in said compartments.

8. The machine recited in claim 7 wherein an air supply is provided, said air supply being connected to devices on said machine including said driving means for said article support to a clamping means to clamp said masks on said mask supports to an article in said article support and to an actuating means on paint guns supported on said frame, said air supply having means to stop said supply from flowing to said devices and to connect said air supply to a lifting means to remove said masks from said article, and spring means to position said article support when said air supply is shut off.

9. The machine recited in claim 8 wherein said means to actuate said air supply is electrical means.

10. A painting machine comprising a frame, a vertical shaft extending upwardly through said frame and having a disk shaped member concentrically disposed thereon, partition members comprising flat sheets attached to said shaft and extending outwardly therefrom and attached at their upper edges to said disk member, each two adjacent said partitions forming a compartment with said disk, a plurality of shafts rotatably supported on said disk member and extending therethrough generally parallel to said shaft, a mask supported on the lower end of each said shaft and a drive engaging member on the upper end thereof, an article support comprising a shaft extending upwardly through said frame and having an article supporting member on the upper end thereof, driving means for said shaft on said article support adapted to rotate said disk and selectively stop each said mask over said article supporting member, a hydraulic cylinder on said frame above said disk and substantially in alignment with said article support, hydraulic means to excite said cylinder to selectively force each said shaft downwardly to bring each said mask into masking engagement with an article supported on said support, paint spray means on said frame adapted to spray paint onto said article when said mask is forced downwardly thereon, and solvent spraying means adapted to spray solvent onto said mask engaging an article at a given time.

11. The machine recited in claim 10 wherein said spray painting means are mounted on a crank and means is provided to rotate said crank to oscillate said paint spray means while paint is spraying on said article.

12. The machine recited in claim 11 wherein the outer edges of said partition members comprise resilient sheets of material adapted to engage complementary sheets of material on said frame whereby a tight wall is formed around said article during spraying operation.

13. The machine recited in claim 12 wherein means is provided to rotate a third said mask support while a first said mask support is urged downwardly to bring its mask into engagement with an article on said support.

14. The machine recited in claim 13 wherein a circuit is provided to actuate said article rotating means, said cylinder, and said mask support rotating means and to actuate said paint spray means when one said mask is in position over an article supported on said article support.

15. The machine recited in claim 10 wherein a shaft positioning means comprising a cam is mounted on said article supporting member, a lever is pivoted to said frame, means is provided to urge said lever into engagement with said shaft when said masks are moved out of engagement with said article, and means is provided to move said lever out of engagement with said cam when a mask is in engagement with an article on said article support.

References Cited in the file of this patent
UNITED STATES PATENTS

| | | |
|---|---|---|
| 1,188,648 | Hastings | June 27, 1916 |
| 1,508,669 | Robezzana | Sept. 16, 1924 |
| 2,350,569 | Reynolds | June 6, 1944 |
| 2,426,391 | Emerson | Aug. 26, 1947 |
| 2,610,578 | Paasche | Sept. 16, 1952 |
| 2,692,552 | Conkle | Oct. 26, 1954 |
| 2,700,929 | Williams | Feb. 1, 1955 |